United States Patent [19]

Billoud

[11] Patent Number: 5,049,061
[45] Date of Patent: Sep. 17, 1991

[54] BLOW-EXTRUDER IN WHICH THE MOULDS ARE CARRIED BY A VERTICAL WHEEL

[75] Inventor: Alain Billoud, Meaux, France
[73] Assignee: CMB Plastique, Cedex, France
[21] Appl. No.: 527,365
[22] Filed: May 23, 1990
[30] Foreign Application Priority Data May 24, 1989 [FR] France ................... 8906814

[51] Int. Cl.⁵ .......................................... B29C 49/36
[52] U.S. Cl. ...................................... 425/522; 425/540
[58] Field of Search ...................... 425/540, 522, 532

[56] References Cited

U.S. PATENT DOCUMENTS

| | | | |
|---|---|---|---|
| 2,579,390 | 12/1951 | Mills | 264/536 |
| 2,579,399 | 12/1951 | Ruekberg | 425/536 |
| 3,334,379 | 8/1967 | Di Settembrini | 425/540 |
| 3,764,250 | 10/1973 | Waterloo | 425/453 X |
| 3,881,855 | 5/1975 | Farkas | 425/540 X |
| 4,197,071 | 4/1980 | Salle et al. | 425/532 X |
| 4,569,651 | 2/1986 | Krall | 425/532 |
| 4,650,412 | 3/1987 | Windstrup et al. | 425/540 X |

Primary Examiner—Richard L. Chiesa
Attorney, Agent, or Firm—Sherman and Shalloway

[57] ABSTRACT

The invention relates to a blow-extruder machine possessing a frame (4) having a plane support structure (6) and supporting a wheel (10) which can rotate about its axis (12) in a vertical plane and which is equipped with moulds (14) on its periphery, the moulds being, as a function of their positions in the plane of the wheel, closed in order to create a moulding cavity (16) or open in order to receive a tubular parison (42), and an extrusion head (40) located in an area in which the opposite mould is open and intended to supply the said parison (42) according to a direction (F) which is inclined relative to the support surface (6) and downwards, the machine comprising a support (60; 70; 80) possessing a plane (P) which is inclined relative to the horizontal and which supports the support surface (6), the inclined plane (P) forming, with a horizontal plane, an acute angle (b) which is approximately equal to 90° less the acute angle (a) formed by the direction (F) of the parison (42) and the support surface (6) such that the direction (F) of the parison (42) is approximately vertical.

6 Claims, 3 Drawing Sheets

BLOW-EXTRUDER IN WHICH THE MOULDS ARE CARRIED BY A VERTICAL WHEEL The present invention relates to a blow-extruder intended to manufacture hollow bodies such as flasks, bottles, etc, from plastic.

Such machines are known, for example machines known under the name of Mills machines. Such machines employ a manufacturing process such as described in Patents FR-A-No. 1,020,377 and U.S. Pat. No. 2,579,390.

A feature of such machines is that they use a large number of moulds (thirteen or fourteen for example) with an extruder which delivers a parison of molten plastic.

The moulds are disposed end to end at the periphery of a wheel which rotates in a specific direction in a vertical plane and according to a uniform movement.

The moulds consist of an inner half-mould fixed to the periphery of the wheel and of an outer half-mould located opposite the latter and mounted so as to slide radially on the wheel. A cam surrounds the periphery of the wheel and, according to its position in the plane of the wheel, drives the outer half-mould between an open position, in which it is distant from the inner half-mould, and a closed position, in which it is clamped against the inner half-mould, in order to form a moulding cavity.

An extrusion head is located in an area in which a mould is open and delivers a tubular parison of molten plastic according to a direction which is inclined relative to the horizontal support surface of the machine. The direction of the parison is such that, by rotation, one of the inner half-moulds takes up a position such that its joining plane with the outer half-mould comes into contact with the parison. In this position, the ends of the parison rest on the end walls of the inner half-mould and the parison possesses a central zone without support located through the cavity.

In this position, the parison must remain straight in order to permit accurate blow-moulding and the formation of an acceptable hollow body.

It is found that, with plastics having a low viscosity in the molten state, such as polyethylene terephthalate, the parison sags in its central area and does not permit uniform blow-moulding supplying a constant-thickness flask wall. The sagging may involve blockage of the tubular parison which no longer permits production of a flask having a wall conforming to that of the cavity.

SUMMARY OF THE INVENTION

In order to remedy this drawback, the present invention aims to provide a blow-extruder which prevents sagging of the parison when it is in contact with the inner half-mould.

To this end, the subject of the invention is a blow-extruder machine possessing a frame having a plane support surface and supporting a wheel which can rotate about its axis in a vertical plane and which is equipped with moulds on its periphery, the moulds being, as a function of their angular positions in the plane of the wheel, closed in order to create a moulding cavity or open in order to receive a tubular parison, and an extrusion head located in an area in which the opposite mould is open and intended to supply the said parison according to a direction which is inclined relative to the support surface and downwards, characterized in that it comprises a support possessing a plane which is inclined relative to the horizontal and which supports the support surface, the inclined plane forming, with a horizontal plane, an acute angle (b) which is approximately equal to 90° less the acute angle (a) formed by the direction of the parison and the support surface such that the direction of the parison is approximately vertical.

According to other characteristics:
The inclined plane consists of an upper face of a wedge whose horizontal lower face rests on the ground;
The inclined plane is a support plate mounted so as to pivot about a horizontal shaft parallel to the axis of the wheel, means for controlling the inclination being provided in order to interact with the support plate;
The support plate is mounted so as to pivot on a baseplate and the means for controlling the inclination consist of a telescopic jack resting on the baseplate;
The inclined plane is a support plate mounted so as to pivot on a foot about a horizontal shaft parallel to the axis of the wheel, wedges for keeping the support plate in an inclined position being located on either side of the central foot, between the ground and the underside of the support plate;
The support may be removed;

BRIEF DESCRIPTION OF THE DRAWINGS

The present invention will be better understood with the aid of the following description which is given with reference to the appended drawings, in which.

DESCRIPTION OF THE PREFERRED EMBODIMENTS

Figure 1:
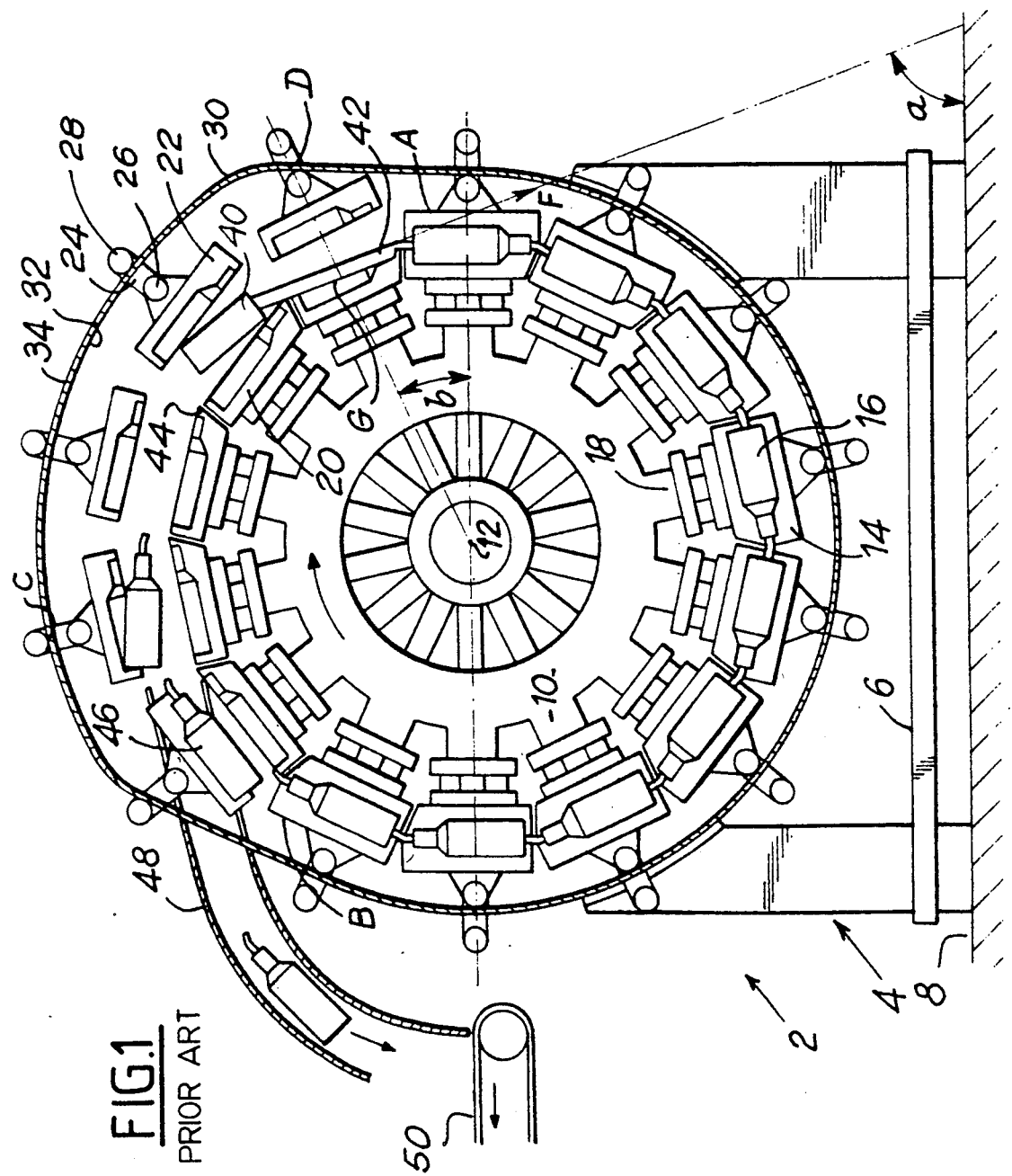
FIG. 1 shows diagrammatically a blow-extruder according to the prior art.

FIG. 1 shows a blow-extruder machine intended for the production of hollow bodies from plastic according to the prior art The machine 2 comprises a frame 4 resting on the ground 8 by means of a horizontal support surface 6.

A wheel 10 is mounted on the frame 4 so as to be able to rotate about a horizontal axis 12 perpendicular to the plane of the wheel 10 in a clockwise direction in FIG. 1.

Moulds 14 are located end to end at the periphery of the wheel. Each mould forms an elongated moulding cavity 16 extending generally perpendicularly to the spoke 18 of the wheel, at the end of which spoke the mould is fixed.

Each mould 14 consists of an inner half-mould 20 fixed permanently on its spoke 18 and of an outer half-mould 22 mounted so as to slide axially on the spoke 18. To this end, the outer half-mould is integral with an arm 24 mounted so as to slide axially on the spoke 18 and comprising an inner roller 26 and an outer roller 28 located on either side of a double cam 30.

The cam 30 consists of a continuous belt surrounding the periphery of the wheel, is spaced from the latter and its inner and outer faces extend perpendicularly to the plane of the wheel in order to form inner 32 and outer 34 cam paths intended to interact with the rollers 26 and 28 respectively.

The profile of the cam 30 comprises four areas:

An area A-B, in which the rollers 26 interact with the path 32 in order to keep the moulds 14 closed, An area B-C, in which the rollers 28 interact with the path 34 in order to open the moulds, An area C-D, for conveying completely open moulds, and An area D-A, for closing the moulds.

An extruder (not shown) possesses an extrusion head 40 located near the point D between the two open half-moulds.

An approximately straight tubular parison 42 of plastic in the molten state emerges from the head 40 according to a direction F forming an acute angle "a" with the support surface 6.

The direction F and the joining plane 44 of the half-mould 20 located opposite the point D of the cam 30 are parallel. The point D is located radially above the horizontal diametrical plane of the wheel such that a spoke passing through the point D and perpendicular to F forms an acute angle "b" with the latter. The angle "b" is equal to 90° less the angle "a".

The innermost generatrix G of the tubular parison 42 is in contact with the joining plane 44 in a median plane of the half-mould 20 opposite the point D, that is to say that the parison 42 rests on the front and rear walls of this half-mould.

Rotation of this half-mould 20 gives rise to the closing of the latter on the parison 42, which is then located in the cavity 16 of the mould, then causes the blow-moulding of the parison (in the area A-B) in a known manner Blow-moulding makes it possible to produce a hollow container (46) which is then sent down a discharge chute (48) (area C-D) towards a conveyor (50) intended to transport it to another work station (not shown).

When the parison 42 is composed of a plastic having a low viscosity in the molten state, it is observed that the parison 42 sags and curves towards the inside of the cavity of the half-mould 20 during rotation of the latter between D and A, which prevents acceptable blow-moulding.

Figure 2:
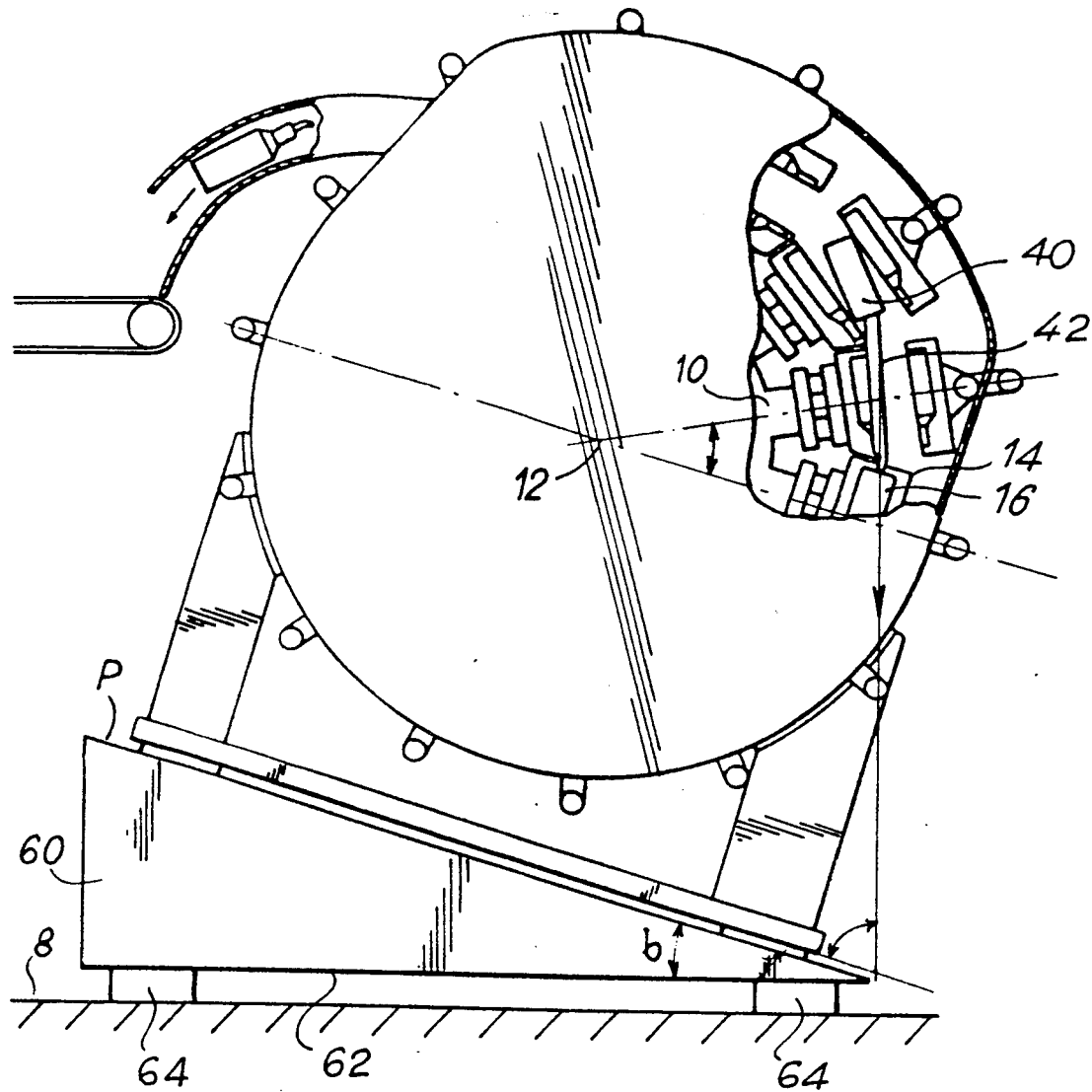
FIG. 2 shows a first embodiment of a machine according to the invention.
Figure 4:
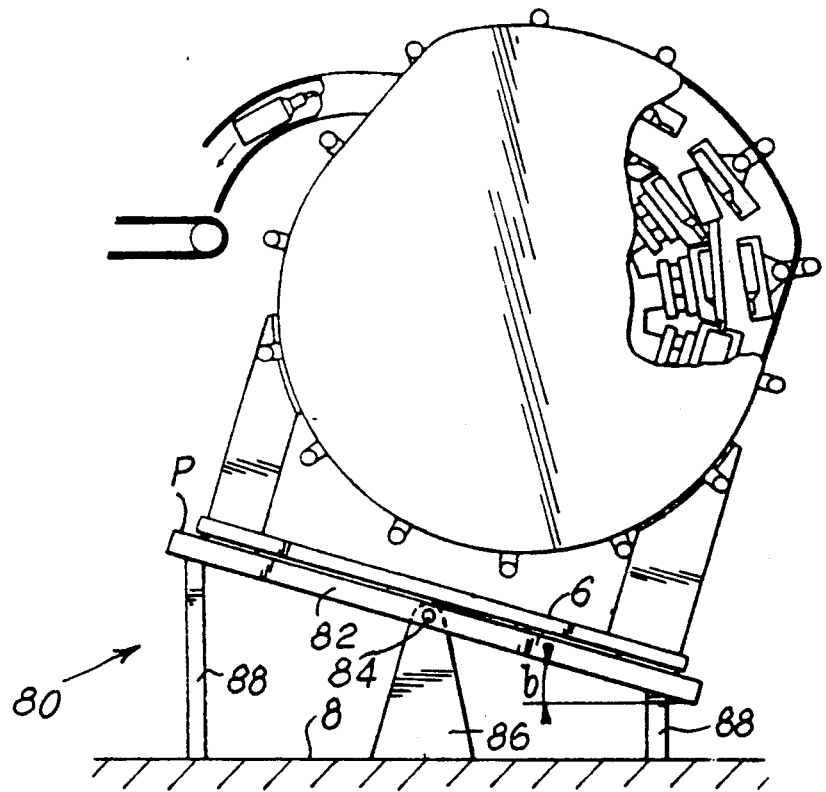
FIG. 4 shows a third embodiment of a machine according to the invention.
Figure 3:
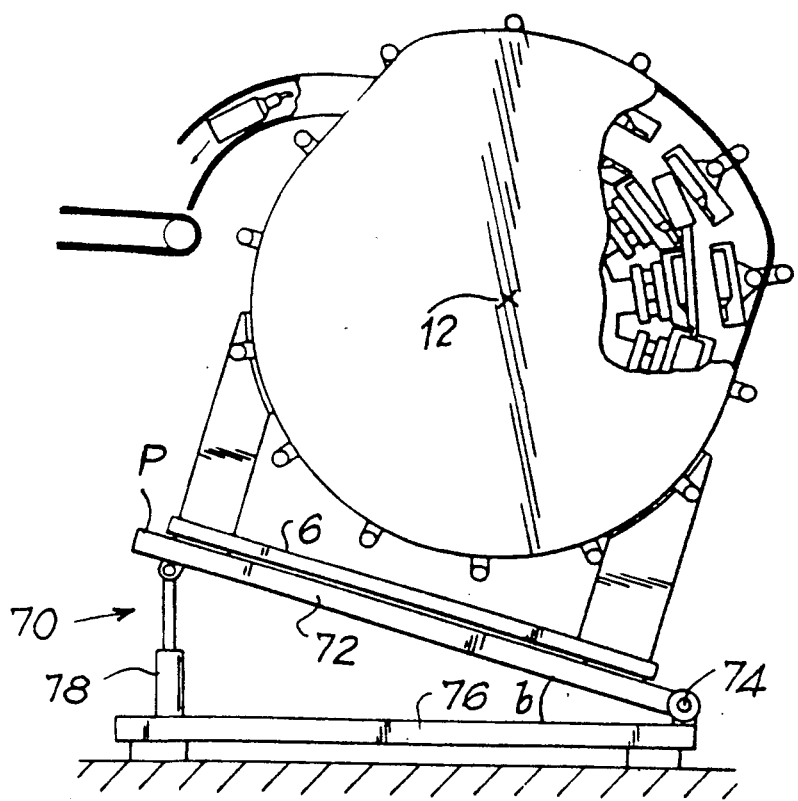
FIG. 3 shows a second embodiment of a machine according to the invention.

FIGS. 2 to 4 show three embodiments of a machine according to the invention which eliminates this drawback.

The numerical references of the elements which are common to FIG. 1 and to FIGS. 2 to 4 have been retained in the remaining description.

As is observed in FIG. 2, a machine according to the invention is composed of a machine such as described above and also comprises an inclined support 60.

The support 60 consists of a wedge possessing a horizontal base 62 supported by wedging blocks 64 resting on the ground 8.

The wedge comprises an inclined plane P forming the acute angle "b", defined above, with the base 62, the intersection of the plane P with the base 62 being parallel to the axis 12 of the wheel 10 and the wedge being disposed so that the direction F of the parison 42 is approximately vertical.

FIG. 3 shows a second embodiment of a machine according to the invention, in which the support for the machine is different.

The support 70 in FIG. 3 comprises a support plate 72 mounted so as to pivot about a shaft 74 parallel to the axis 12 of the wheel, on a baseplate 76. The support surface 6 rests on the upper face of the support plate 72.

The baseplate 76 is horizontal and rests on the ground with the aid of adjustment wedges.

Means for controlling the inclination of the plate 72 relative to the baseplate 76 are provided between the plates 72 and 76 close to the end of the latter opposite to the pivoting shaft 74.

To this end, a telescopic jack 78 rests on the plate 76 and controls the pivoting of the plate 72 so that the angle between the latter and a horizontal plane is equal to the angle "b" defined above.

FIG. 4 describes a third embodiment of a machine according to the invention, in which the support 80 consists of a support plate 82 on which the support surface 6 of the machine rests.

The plate 82 is mounted so as to pivot about a shaft 84 on a foot 86. The shaft 84 is horizontal and parallel to the axis of rotation of the wheel of the machine.

The foot 86 possesses an approximately trapezoidal cross-section, the base of the trapezium resting on the ground 8. The foot 86 extends perpendicularly to the plane of the wheel. Wedges 88 for keeping the support plate 82 in an inclined position are disposed between the ground 8 and the lower face of the support plate 82. The wedges 88 ensure that the acute angle formed by the plate 82 and a horizontal plane is equal to the angle "b" defined above.

In the three embodiments of the machine according to the invention, the parison 42 has a vertical direction. When this parison comes into contact with the joining plane of the inner half-mould, it is no longer supported on the walls of this half-mould, which eliminates any risk of sagging of the latter and permits accurate blow-moulding when the mould is driven in rotation towards a blow-moulding position.

This makes it possible to produce, in an acceptable manner, hollow flasks made from plastic with a low viscosity in the molten state, such as, in particular, polyethylene terephthalate.

I claim:

1. In a blow extruder machine comprising a frame (4) having a plane support surface (6) and supporting a wheel (10) which can rotate about its axis (12) in a vertical plane and which is equipped with moulds (14) on its periphery, the moulds being, as a function of their positions in the plane of the wheel, closed in order to create a moulding cavity (16) or open in order to receive a tubular parison (42), and an extrusion head (40) located in an area in which the opposite mould is open and intended to supply the said parison (42) according to a direction (F) which is inclined relative to the support surface (6) and downwards, the improvement which comprises a support (60; 70; 80) comprising a plane (P) which is inclined relative to the horizontal and which supports the support surface (6), the inclined plane (P) forming, with a horizontal plane, an acute angle (b) which is approximately equal to 90° less another acute angle (a) formed by the direction (F) of the parison (42) and the support surface (6) such that the direction (F) of the parison (42) is approximately vertical.

2. A machine according to claim 1, wherein the inclined plane (P) consists of an upper face of a wedge (60) whose horizontal lower face (62) rests on the ground (8).

3. A machine according to claim 1, wherein the inclined plane (P) comprises a support plate (72) mounted so as to pivot about a horizontal shaft (74) parallel to the axis of the wheel, means (78) for controlling the inclination being provided in order to interact with the support plate.

4. A machine according to claim 3, wherein the support plate (72) is mounted so as to pivot on a baseplate (76) and the means (78) for controlling the inclination comprises a telescopic jack resting on the baseplate (76).

5. A machine according to claim 1, wherein the inclined plane (P) comprises a support plate (82) mounted so as to pivot on a foot (86) about a horizontal shaft (84) parallel to the axis of the wheel, wedges (88) for keeping the support plate (82) in an inclined position being located on either side of the foot, between the ground and the underside of the support plate (82).

6. A machine according to claim 1, wherein the support may be removed.

* * * * *